(12) United States Patent
Hamada et al.

(10) Patent No.: US 8,208,669 B2
(45) Date of Patent: Jun. 26, 2012

(54) COMBINATION SPEAKER SUPPORT, DISPLAY SUPPORT, AND SOUND GUIDE

(75) Inventors: Michinori Hamada, Tottori (JP); Hidekazu Tutao, Tottori (JP); Takashi Sugai, Tottori (JP)

(73) Assignee: Sanyo Electric Co., Ltd., Osaka (JP)

( * ) Notice: Subject to any disclaimer, the term of this patent is extended or adjusted under 35 U.S.C. 154(b) by 1272 days.

(21) Appl. No.: 11/919,751

(22) PCT Filed: Apr. 26, 2006

(86) PCT No.: PCT/JP2006/308779
§ 371 (c)(1),
(2), (4) Date: Nov. 1, 2007

(87) PCT Pub. No.: WO2006/120912
PCT Pub. Date: Nov. 16, 2006

(65) Prior Publication Data
US 2009/0080681 A1    Mar. 26, 2009

(30) Foreign Application Priority Data
May 13, 2005   (JP) ................. 2005-140968

(51) Int. Cl.
*H04R 9/06* (2006.01)
*H04R 1/02* (2006.01)
*H04N 5/64* (2006.01)
*H05K 7/00* (2006.01)
*H05K 5/00* (2006.01)
*G06F 1/16* (2006.01)

(52) U.S. Cl. .... 381/333; 381/388; 348/836; 361/679.23

(58) Field of Classification Search ............... 381/333, 381/337, 338, 345, 386, 388; 348/825, 826, 348/836; 361/FOR. 104, FOR. 105, 679.23, 361/679.61
See application file for complete search history.

(56) References Cited

U.S. PATENT DOCUMENTS

| | | | |
|---|---|---|---|
| 6,335,974 B1 * | 1/2002 | Kunimoto | 381/333 |
| 2006/0078138 A1 * | 4/2006 | Wada | 381/333 |
| 2006/0187364 A1 * | 8/2006 | Fukano | 381/388 |

FOREIGN PATENT DOCUMENTS

| | | |
|---|---|---|
| JP | 03-086676 | 9/1991 |
| JP | 08-168037 | 6/1996 |
| JP | 2005-117201 | 4/2005 |

* cited by examiner

*Primary Examiner* — Jesse Elbin
(74) *Attorney, Agent, or Firm* — Kubotera & Associates, LLC

(57) ABSTRACT

To provide an electronic device whose manufacturing cost and weight can be reduced and whose sound quality can be prevented from deteriorating.

Speakers 28 are provided on a rear side of a liquid crystal display part 20, inside a casing 12 so as to partly protrude downward from the liquid crystal display part 20, and sound guide ducts 24 linearly extend from a front face side of the speakers 28, and thus the sound guide ducts 24 are not bent. Therefore, even high-frequency sound generated from the speakers 28 can be outputted to an external part of the casing 12 without any sound quality deterioration. Further, the speakers 28 do not have to be disposed on a front face of the casing 12 which is on an outer side of the liquid crystal display part 20, and therefore, an electronic device 10 can be made compact, which can reduce weight and manufacturing cost of the electronic device 10.

10 Claims, 3 Drawing Sheets

COMBINATION SPEAKER SUPPORT, DISPLAY SUPPORT, AND SOUND GUIDE

TECHNICAL FIELD

The present invention relates to an electronic device including a speaker.

BACKGROUND ART

Among conventional electronic devices, those including a speaker such as, for example, a liquid crystal television set and a car navigation system have been known. In most of electronic devices of this type, the speaker is positioned on an outer side of a liquid crystal display part in a front view, but positioning the speaker on the outer side of the liquid crystal display part causes a problem of an increase in size of the electronic devices. In particular, the electronic device with an increased size is difficult to dispose in a limited space such as, for example, the interior of an automobile, which makes the electronic device not convenient to use.

To solve the above problem, there has been proposed an electronic device in which a speaker is disposed on a rear side of a liquid crystal display part (see, a patent document 1 below). In this electronic device, the speaker is disposed on the rear side of the liquid crystal display part, inside a casing, and a sound guide channel guiding sound generated from the speaker to an external part of the casing is separately and independently formed.

[Patent document 1]
Japanese Patent Application Laid-open No. Hei 8-168037

DISCLOSURE OF THE INVENTION

[Problems to be Solved by the Invention]

However, in the above-described electronic device, the sound guide channel guiding the sound generated from the speaker to the external part of the casing has to be formed separately and independently, which poses another problem of an increase in the number of assembly processes, manufacturing cost, and weight of the electronic device. Further, if the speaker is disposed near a center portion of the liquid crystal display part as in conventional electronic devices, the sound guide channel has to be bent so as to bypass the liquid crystal display part. However, it is difficult to output especially high-frequency sound through the bent sound guide channel to the external part of the casing, which also poses another problem of sound quality deterioration.

Therefore, considering the above-described circumstances, it is an object of the present invention to provide an electronic device whose assembly processes, manufacturing cost, and weight can be reduced and whose sound quality can be prevented from deteriorating.

[Means for Solving the Problems]

According to a first aspect of the invention, an electronic device includes: a casing as an outer frame; a display part provided inside the casing to display predetermined information; a speaker provided on a rear side of the display part, inside the casing so as to partly protrude from the display part; and a sound guide part extending linearly from a front face side of the speaker to guide sound generated from the speaker to an external part of the casing.

According to a second aspect of the invention, in the electronic device of the first aspect, the sound guide part also has a display part fixing function of fixing the display part.

According to a third aspect of the invention, in the electronic device of the first or second aspect, the sound guide part also has a speaker fixing function of fixing the speaker.

According to a fourth aspect of the invention, in the electronic device of any one of the first to third aspects, the sound guide part is made of a material not transmitting light.

[Effect of the Invention]

According to the first aspect of the invention, the speaker is provided on the rear side of the display part, inside the casing so as to partly protrude from the display part, and the sound guide part guiding the sound generated from the speaker to the external part of the casing extends linearly from the front face side of the speaker, and thus the sound guide part is not bent. Therefore, even high-frequency sound generated from the speaker can be outputted to the external part of the casing without any deterioration in sound quality. Further, since the speaker is provided on the rear side of the display part, inside the casing so as to partly protrude from the display part, the speaker does not have to be disposed on the front face of the casing which is on the outer side of the display part, as in conventional electronic devices. This can make the electronic device compact, resulting in weight reduction of the electronic device. As a result, the electronic device can be easily disposed in a limited space such as, for example, the interior of an automobile.

According to the second aspect of the invention, since the sound guide part also has the display part fixing function of fixing the display part, it is possible to form a sound guide channel by using an existing constituent member basically required for the electronic device. This can prevent an increase in the number of assembly processes and weight of the electronic device, as contrast to a case where the sound guide part is formed by using an independent member different from a fixing part fixing the display part. Further, by the output of sound from the speaker, not only the casing can be resonated but also the display part can be resonated via the sound guide channel, which can improve quality of sound outputted from the speaker.

According to the third aspect of the invention, since the sound guide part also has the speaker fixing function of fixing the speaker, it is possible to form a sound guide channel by using an existing constituent member basically required for the electronic device. This can prevent an increase in the number of assembly processes and weight of the electronic device, as contrast to a case where the sound guide part is formed by using a different independent member fixing the speaker.

According to the fourth aspect of the invention, since the sound guide part is made of a material not transmitting light, light from the display part can be prevented from transmitting through the sound guide part and leaking to the external part of the casing, even in the structure where especially the sound guide part also has the display part fixing function of fixing the display part.

EXPLANATION OF CODES

10 electronic device
12 casing 20 liquid crystal display part (display part)
24 sound guide duct (sound guide part)
28 speaker

[Best Mode For Carrying Out The Invention]

Next, an electronic device according to an embodiment of the present invention will be described with reference to the drawings. It should be noted that the electronic device of the present invention is widely applicable to, for example, a liquid crystal television set, a car navigation system, and so on.

Figure 1:
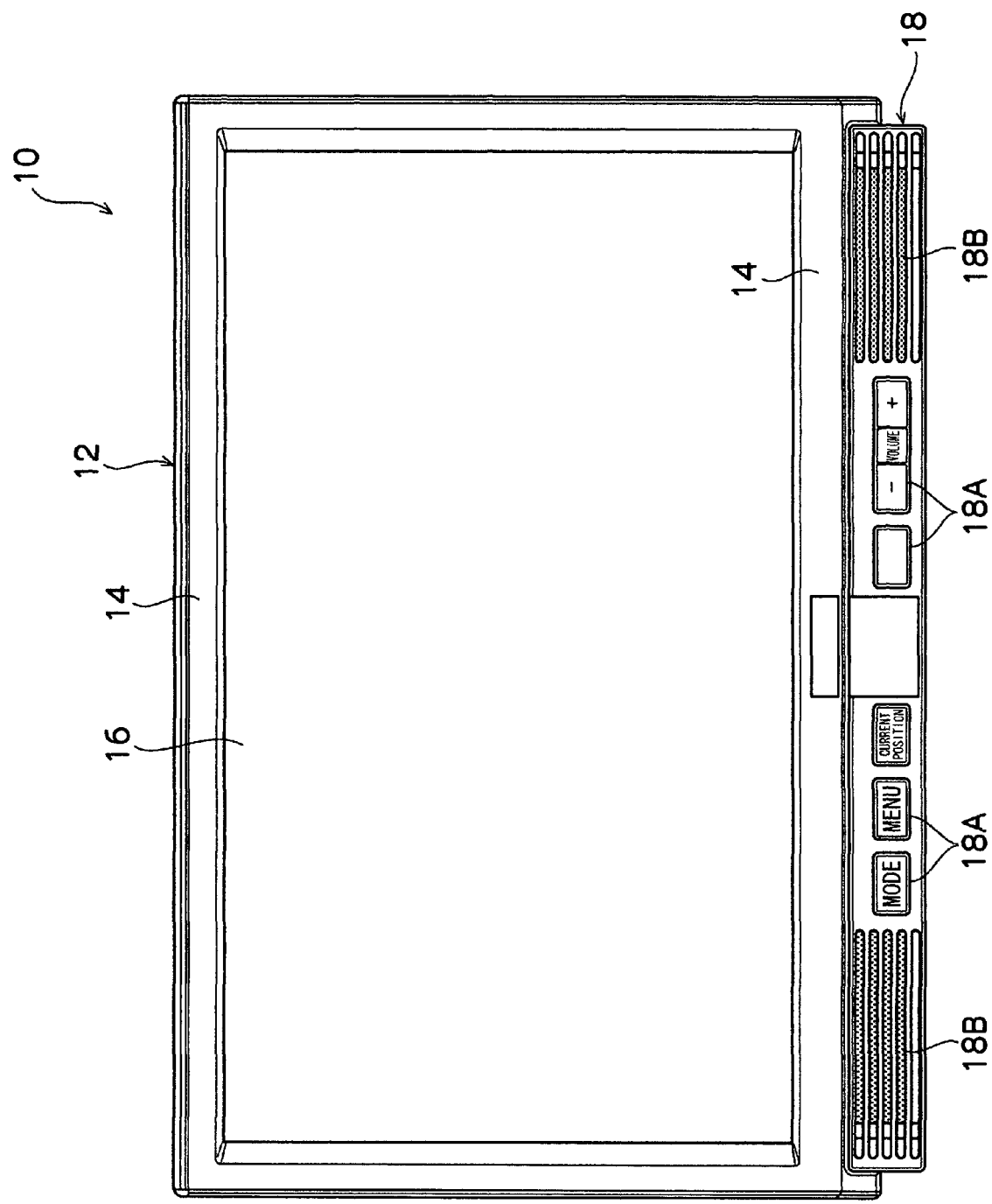
[FIG. 1] A front view of an electronic device according to an embodiment of the present invention.
Figure 2:
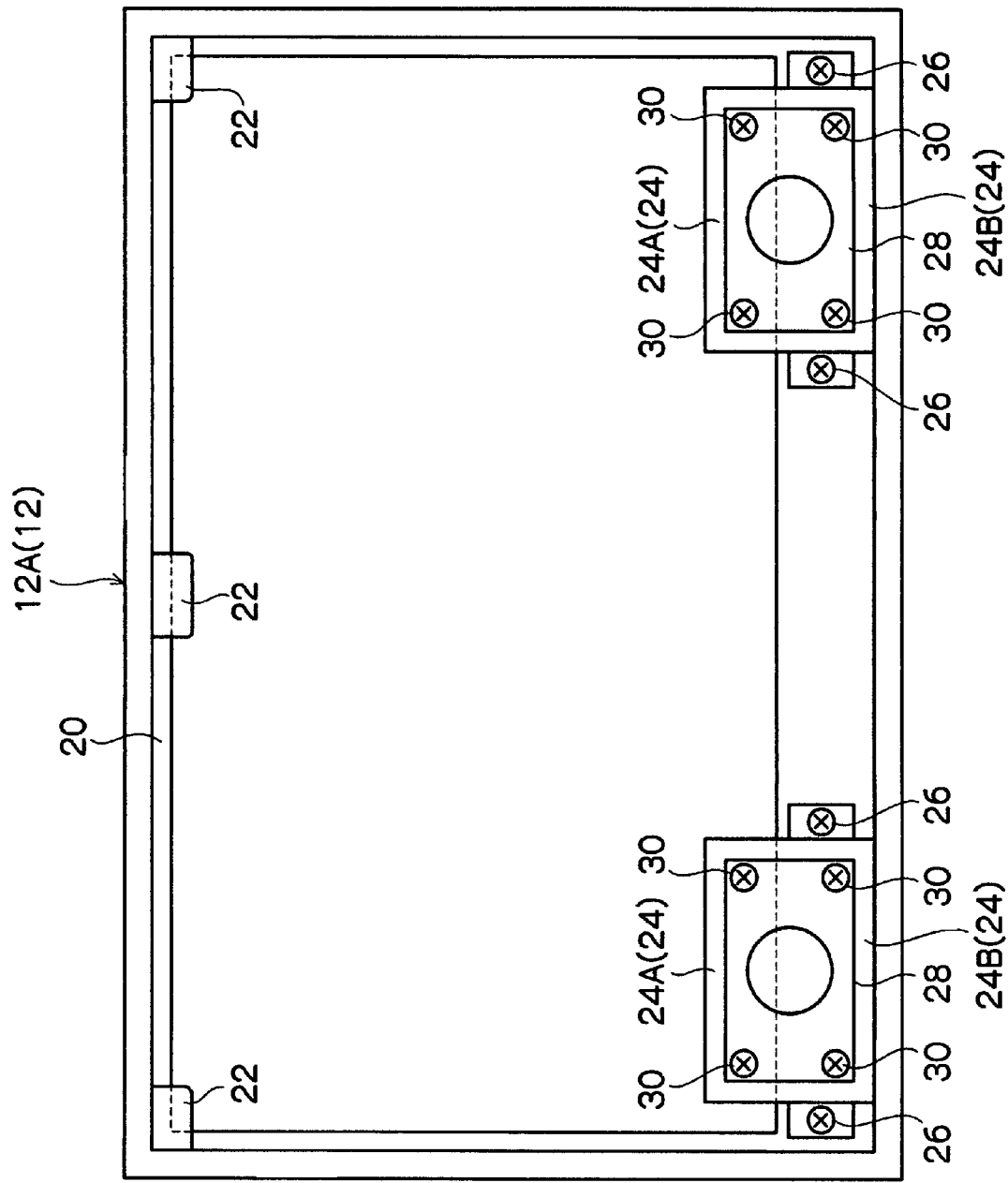
[FIG. 2] A structural view of the electronic device according to the embodiment of the present invention seen from behind (a rear face side), with a casing rear portion of a casing included in the electronic device being detached.
Figure 3:
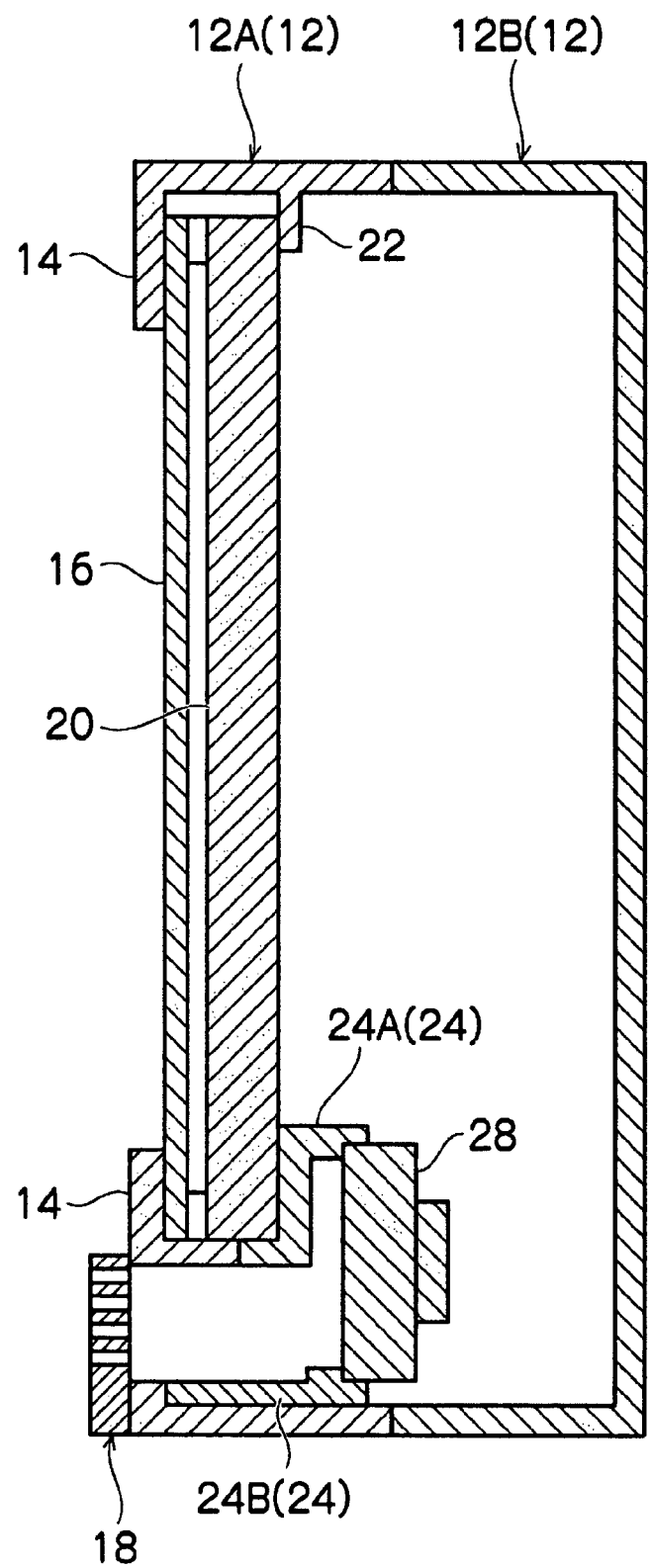
[FIG. 3] A vertical cross-sectional view of the electronic device according to the embodiment of the present invention.

As shown in FIG. 1 to FIG. 3, an electronic device 10 includes a box-shaped casing 12 as an outer frame. The casing 12 is composed of a casing front portion 12A positioned on a forward (front face) side and a casing rear portion 12B positioned on a backward (rear face) side which are combined with each other. Support parts 14 are formed in front of (on a front face side of) the casing front portion 12A, and a touch panel part 16 is disposed behind (on rear face side of) the support parts 14. Further, in front of (on a front face side of) the casing 12, an operation part 18 is provided under the touch panel part 16. In the operation part 18, input buttons 18A and so on necessary for the operation are disposed. Further, in left and right portions of the operation part 18, slit parts 18B forming entrances of later-described sound guide ducts (sound guide parts) 24 are provided respectively.

Further, inside the casing front portion 12A, a liquid crystal display part (display part) 20 displaying predetermined information is disposed behind (on a rear face side of) the touch panel part 16. The liquid crystal display part 20 together with the touch panel part 16 is positioned and fixed inside the casing front portion 12A by claw portions 22 formed on the casing front portion 12A, upper sound guide duct parts 24A constituting the later-described sound guide ducts 24, and the aforesaid support parts 14.

Further, as shown in FIG. 2, inside the casing front portion 12A, the sound guide ducts (sound guide parts) 24 guiding sound generated from later-described speakers 28 to the front face of the casing front portion 12A are attached to left and right lower portions of the liquid crystal display part 20 by screws 26, respectively. Each of the sound guide ducts 24 is attached to the casing front portion 12A and is formed as a space closed by the upper sound guide duct part 24A positioning and fixing the liquid crystal display part 20 and a lower sound guide part 24B attached to the casing front portion 12A. Therefore, sound generated from the later-described speakers 28 is outputted from the slit parts 18B without leaking to an external part of the casing 12. Further, the upper sound guide duct parts 24A and the lower sound guide duct parts 24B are made of a material not transmitting light, such as, for example, black plastic resin.

Further, as shown in FIG. 2, each of the speakers 28 is attached by screws 30 to a rear end portion of the upper sound guide duct part 24A and a rear end portion of the lower sound guide duct part 24B. In more detail, each of the sound guide ducts 24 extends linearly from the front face side of the speaker 28 toward the front face side of the casing front portion 12A. Incidentally, a front end portion of each of the upper sound guide duct parts 24A and a front end portion of each of the lower sound guide duct parts 24B are connected to the slit part 18B. Further, the speakers 28 are provided on the rear side of the liquid crystal display part 20, inside the casing front portion 12A so as to partly protrude downward from the liquid crystal display part 20.

As described above, in the electronic device 10 of this embodiment, the sound guide ducts 24 also have a display part fixing function of fixing the liquid crystal display part 20 and also has a speaker fixing function of fixing the speakers 28.

Next, the operation of the electronic device 10 of this embodiment will be described.

As shown in FIG. 1 to FIG. 3, the speakers 28 are provided on the rear side of the liquid crystal display part 20, inside the casing front portion 12A so as to partly protrude downward from the liquid crystal display part 20, and the sound guide ducts 24 extend linearly from the front face side of the speakers 28 toward the front face side of the casing front portion 12A. Thus, the sound guide ducts 24 are not bent. Therefore, even high-frequency sound generated from the speakers 28 can be outputted to the external part of the casing 12 without any sound quality deterioration. Further, since the speakers 28 do not have to be disposed on the front face of the casing 12 which is on the outer side of the liquid crystal display part 20, the electronic device 10 can be made compact, resulting in reduction in weight of the electronic device 10. As a result, the electronic device 10 can be easily disposed even in a limited space such as, for example, the interior of an automobile.

The sound guide ducts 24 can be formed by using existing constituent members basically necessary for the electronic device 10 especially because the sound guide ducts 24 also have the display part fixing function of fixing the liquid crystal display part 20. This can prevent an increase in the number of assembly processes and weight of the electronic device 10, as contrast to a case where the sound guide ducts are formed by using independent members different from fixing parts fixing the liquid crystal display part 20. Further, since by the output of sound from the speakers 28, not only the casing 12 can be resonated but also the liquid crystal display part 20 can be resonated via the sound guide ducts 24, it is possible to improve quality of sound outputted from the speakers 28.

Likewise, since the sound guide ducts 24 also have the speaker fixing function of fixing the speakers 28, the sound guide ducts 24 can be formed by using existing constituent members basically necessary for the electronic device 10. This can prevent an increase in the number of assembly processes and weight of the electronic device 10, as contrast to a case where the sound guide parts are formed by using different independent members fixing the speakers 28.

Further, since the sound guide ducts 24 are made of a material not transmitting light (in this embodiment, black plastic resin), light from the liquid crystal display part 20 and the operation part 18 can be prevented from transmitting through the sound guide ducts 24 and leaking to the external part of the casing 12 via the slit parts 18B, even in the structure where especially the sound guide ducts 24 also have the display part fixing function of fixing the liquid crystal display part 20.

What is claimed is
1. An electronic device comprising:
a casing as an outer frame;
a display part provided in said casing to display information;
a speaker provided on a rear side of said display part, inside said casing; and
a sound guide part extending linearly from a front face side of said speaker to guide sound generated from said speaker to an external part of said casing,
wherein said sound guide part includes an upper sound guide duct part and a lower sound guide duct part, and
said casing includes an upper support part, a lower support part, and a claw portion so that the upper support part and the claw portion sandwich an upper portion of the display part, and the lower support part and the upper sound guide duct part sandwich a lower portion of the display part.

2. The electronic device according to claim 1, wherein said sound guide part has a display part fixing function for fixing said display part.

3. The electronic device according to claim 2, wherein said sound guide part has a speaker fixing function for fixing said speaker.

4. The electronic device according to claim 2, wherein said sound guide part is made of a material not transmitting light.

5. The electronic device according to claim 2, wherein said speaker is arranged over the upper sound guide duct part and the lower sound guide duct part to cover an opening portion between the upper sound guide duct part and the lower sound guide duct part.

6. The electronic device according to claim 1, wherein said sound guide part has a speaker fixing function for fixing said speaker.

7. The electronic device according to claim 6, wherein said sound guide part is made of a material not transmitting light.

8. The electronic device according to claim 1, wherein said sound guide part is made of a material not transmitting light.

9. The electronic device according to claim 1, wherein said casing includes a casing front portion and a casing rear portion attached to the casing front portion, said upper support part, said claw portion, said lower support portion, said upper sound guide duct part, and said lower sound guide duct part being disposed on the casing front portion.

10. The electronic device according to claim 1, wherein said speaker is arranged over the upper sound guide duct part and the lower sound guide duct part to cover an opening portion between the upper sound guide duct part and the lower sound guide duct part.

\* \* \* \* \*